United States Patent
Reichel et al.

(10) Patent No.: US 8,531,771 B2
(45) Date of Patent: Sep. 10, 2013

(54) LED LIGHT SOURCE WITH COLLIMATION OPTICS

(75) Inventors: Steffen Reichel, Mehlingen (DE); Ralf Biertuempfel, Mainz-Kastel (DE); Helge Vogt, Bodenheim (DE)

(73) Assignee: Schott AG (DE)

( * ) Notice: Subject to any disclaimer, the term of this patent is extended or adjusted under 35 U.S.C. 154(b) by 875 days.

(21) Appl. No.: 12/564,371

(22) Filed: Sep. 22, 2009

(65) Prior Publication Data

US 2010/0091490 A1  Apr. 15, 2010

(30) Foreign Application Priority Data

Sep. 22, 2008 (DE) .................. 10 2008 048 379

(51) Int. Cl.
*G02B 1/00* (2006.01)

(52) U.S. Cl.
USPC .......... 359/619; 359/629; 264/1.32; 264/2.7; 362/235; 362/249.02

(58) Field of Classification Search
USPC ................ 362/1.32, 2.7, 235, 249.02, 800; 359/619–629
See application file for complete search history.

(56) References Cited

U.S. PATENT DOCUMENTS

| | | | |
|---|---|---|---|
| 7,537,347 B2 * | 5/2009 | Dewald | ............ 353/38 |
| 2005/0067944 A1 | 3/2005 | Masuda et al. | |
| 2010/0130246 A1 | 5/2010 | Biertumpfel et al. | |

FOREIGN PATENT DOCUMENTS

| | | |
|---|---|---|
| DE | 689 15 963 T2 | 2/1995 |
| DE | 102004038727 A1 | 2/2006 |
| DE | 10 2006 001 790 A1 | 7/2007 |
| DE | 20 2006 020 378 U1 | 6/2008 |
| EP | 1 942 370 A1 | 7/2008 |
| JP | 61179003 A | 8/1986 |
| JP | H11-237850 A | 8/1999 |
| JP | 2001283362 A | 10/2002 |
| JP | 2005276956 A | 10/2005 |
| JP | 2006278567 A | 10/2006 |
| JP | 2006317486 A | 11/2006 |
| JP | 2008041546 A | 2/2008 |
| JP | 2008509440 A | 3/2008 |
| WO | WO 2005041632 A2 | 5/2005 |

OTHER PUBLICATIONS

Henry Lehtiniemi, "Dutch Office Action for Patent Application 2003523", Jan. 28, 2010, Publisher; Netherlands Patent Office, Published in: NL.
German Patent Office, German Office Action, Jul. 29, 2009.
Dr. Renate Ottman, "Related International Office Action", Apr. 11, 2013, Publisher: F21V, Published in: DE.
"Related JP Application No. JP 2009-216627 Office Action", Feb. 14, 2013, Published in: JP.
Li He, "Chinese Patent Application No. 200910253032.1 2nd Office Action", Nov. 1, 2012, Publisher: SIPO, Published in: CN.
Eichi Yoshida, "Related Patent Application No. JP 2009-216627 Office Action", Oct. 29, 2012, Publisher: JPO, Published in: JP.
Kobayashi, Yoshihtio, "JP Application No. 2009-216627 Office Action Nov. 14, 2011", , Publisher: JPO, Published in: JP.

* cited by examiner

*Primary Examiner* — Anabel Ton
(74) *Attorney, Agent, or Firm* — Kaplan Breyer Schwarz & Ottesen, LLP

(57) ABSTRACT

The invention relates to a LED light source comprising a preferably aspheric glass lens having an aspect ratio of more than 0.1.

20 Claims, 6 Drawing Sheets

LED LIGHT SOURCE WITH COLLIMATION OPTICS

FIELD OF THE INVENTION

The present invention relates to a LED light source comprising collimation optics. In particular, the invention relates to a lens array and to a method for fabricating a lens array.

BACKGROUND OF THE INVENTION

Light emitting semiconductor diodes (LEDs) are increasingly used for illumination purposes. An advantage of such light sources is their high efficiency and long life time.

The light emitting layer of a semiconductor which is for instance disposed as a film LED on a circuit board emits light within a wide angle of 180°. For many illumination purposes it is of advantage to bundle the light emitted by the LED(s). An angular range of about +/−30° from the central axis of the LED already includes about 70% of the emitted light power. However, it is desirable to collect the light in an emission angle as wide as possible such as to increase efficiency. In practice, special optics for this purpose are known which comprise a side reflector that reflects light which is emitted outside some angle, wherein the light is folded by another reflection and is then emitted in forward direction.

While such optics yield satisfying efficiencies, their fabrication is cumbersome due to the complex geometry which is required. Also, such complex geometries may generally be produced only from plastic material. Most plastic materials are not suitable for high power LEDs which may produce temperatures of 120° C. and more, since they are not sufficiently heat resistant. Also, plastics tend to haze, especially if exposed to high luminance for a long period.

Another way to collimate light emitted by a LED is by means of a Fresnel zone plate. Such diffractive optics is able to yield high efficiencies. However, the fabrication of microstructures required for this, in particular in the area of wide emitting angles in which the spacing of the zone plate rings have to get thinner and thinner, is expensive and complex, unless impossible. Additionally, a Fresnel zone plate is only active for a single wavelength. To obtain a good collimation effect an array of Fresnel zone plates has to provide a separate zone plate for each LED color. White light LEDs which due to a converter material emit light in several wavelengths are not able to provided satisfying collimation by means of a Fresnel zone plate.

Prior micro-lens arrays made of glass which conventionally are fabricated employing thin film techniques, generally fail to provide a satisfying collimation effect, at least in the peripheral area of the emitted light.

OBJECT OF THE INVENTION

An object of the invention, therefore, is to provide a LED light source which at least mitigates the disadvantages of the prior art discussed above.

In particular, it is an object of the invention to provide a heat resistant lens array with a good collimation effect.

In particular, a sufficient collimation effect of the lens array shall be provided for a wide range of emission angles.

SUMMARY OF THE INVENTION

This object of the invention is already achieved by a LED light source, by an aspheric collimation lens and by a method for fabricating a lens array.

The invention relates, in a first aspect thereof, to a LED light source, wherein a LED light source has to be understood as any arrangement comprising a LED which emits light. As such, the LED light source does not necessarily have to serve for illumination purposes but may be used as a signaling device, e.g. Preferably however, the LED light source is particularly provided as a room, reading or signaling illumination device. Other preferred applications are in the automotive field; in particular the LED light source of the invention may be used as an automobile headlight or backlight. Also, such high power LEDs will find application in projectors for cinematic, business and/or home cinema projection applications.

The LED light source comprises at least one LED and at least one collimation lens which preferably has an aspheric shape and is made from glass or glass ceramics. A collimation lens is preferably understood as a convex lens which bundles light, and which, in particular, is disposed relative to the emission face of the LED such as to emit a light bundle of substantially parallel light beams.

Since in the case of a wide emission angle, in particular an emission angle of more than 30°, the relation sin α≈α does not hold anymore, in a preferred embodiment of the invention the lens comprises a freeform surface; in particular the collimation lens has an aspheric shape. By choosing appropriate parameters, an asphere allows to obtain a collimation effect in a wide emission angle of up to 60°. In one embodiment of the invention the asphere has a rotational symmetric shape.

The shape of the asphere is preferably defined by the following equation:

$$z = \frac{cr^2}{1 + \sqrt{1-(1+k)c^2r^2}} + \alpha_1 r^2 + \alpha_2 r^4 + \alpha_3 r^6 + \alpha_4 r^8 + \alpha_5 r^{10} + \alpha_6 r^{12} + \alpha_7 r^{14} + \alpha_8 r^{16}$$

wherein c is the curvature, r is the radius (=1/c), k is the conical constant and $\alpha_n$ are the asphere coefficients by which the asphere can be adapted to the respective optical arrangement.

Alternatively, the lens may have a spherical shape. Such lenses generally may be fabricated at lower costs.

According to the invention the aspect ratio, i.e. the relation of height to width of the lens, is more than 0.1. The width of the lens is generally defined by its diameter. The height of the lens shall be understood as the crown height of the lens.

In contrast to micro-structures which are applied by thin film techniques, the chosen aspect ratio of more than 0.1 allows to provide lenses, in particular in lens arrays, which exhibit a good collimation effect within a wide emission angle. Since it is made of glass or glass ceramics the lens and lens array, respectively, is temperature stable and may be arranged close to the LED, in particular in a distance of less than 1.5 mm, preferably less than 1 mm and most preferably less than 0.5 mm from the LED. By placing it such close to the LED a particularly small lens may be provided, which collects light in a wide emission angle.

In a preferred embodiment of the invention the aspect ratio is more than 0.2, preferably more than 0.3, and most preferably more than 0.4. In particular, aspect ratios of about 0.5 or more are possible. The inventors have found out that such lenses, in particular in the form of lens arrays, may be fabricated in very simple manner by a hot pressing technique.

The LED light source is preferably formed such that light emitted by the LED in an angle of at least +/−30°, preferably +/−50°, is emitted in substantially bundled manner in forward direction.

"Emitted in substantially bundled manner in forward direction" means that the light beams are comprised in an angle of less than 10° relative to the axis of the collimation lens.

The LED light source preferably comprises a plurality of LEDs and an array including a plurality of collimation lenses. Each LED in the array has a collimation lens associated therewith. In contrast to Fresnel zone plates, in particular an RGB LED array allows to use a similarly formed lens for each color. A LED array according to the invention is also useful for white light LEDs.

In a further particular embodiment of the invention the LED-array may comprise at least two different collimation lenses adapted to each of the light colors, for an increased efficiency.

The invention allows to provide a LED light source which is formed such that divergence of a light beam comprising light emitted by the LED in an emission angle of +/−60° relative to the central axis is, in a distance of 25 cm, less than 5 cm, preferably less than 2.5 cm.

"Divergence" means that a diameter of the light bundle increases relative to the diameter of the emission face of the LED by at most said distance. Herein, only that fraction of light which is emitted in an emission angle of +/−60° relative to the central axis of the LED, and to the central axis of the lens associated with the LED, respectively, is considered. A good collimation effect for light up to an emission angle of 60° allows to obtain an extraordinary efficiency, since the fractions of light that are emitted in an angle of more than 60° only account to a small amount of the energy emitted from the LED.

Glass and glass ceramics having a high refractive index $n_d$ of more than 1.4, preferably more than 1.5 and most preferably more than 1.7 are particularly useful for forming the collimation lens.

To avoid color errors and to provide a collimation lens which is useful for several different light colors, preferably a material having an Abbe coefficient $v_d$ of more than 35, preferably more than 40, and most preferably more than 50 is used.

The invention is particularly useful for high power LEDs which, in operation, may attain 100° C. and more.

In a preferred embodiment of the invention the LED light source is arranged on a transparent plate, in particular to form a LED array.

The crown height of the collimation lens is, in a preferred embodiment of the invention, more than 0.1, preferably more than 0.3 and most preferably more than 0.5 mm. The diameter of the collimation lens is preferably between 0.2 and 10 mm, most preferably between 1 and 5 mm. Such small lenses are also known as micro-lenses. The large crown height allows to obtain an aspect ratio which is useful for collimation of light in a wide emission angle.

The invention further relates to an aspherical collimation lens made of glass or glass ceramics which in particular exhibits any of the characteristics of the lens as set forth above such as material characteristics, etc. The aspect ratio of the collimation lens is more than 0.1, preferably more than 0.3, and most preferably more than 0.4 while the diameter of the collimation lens is less than 10, and preferably less than 5 mm.

The invention allows to provide a temperature stable collimation lens with a good collimation effect in a wide angular range.

Preferably, the collimation lens is a part of a lens array that comprises a plurality of collimation lenses.

There, the lenses are preferably arranged on a plate made of glass or glass ceramics. In particular, it is contemplated to provide a one-piece component which is formed as a plate comprising lenses. In one embodiment, the glass or glass-ceramic plate comprises, at least preferably, a glass filter or a glass-ceramic filter or a glass converter or a glass-ceramic converter. In such a manner it is possible to vary the emitted color. Said filter is a color filter, e.g., for setting the light color, and/or a polarization filter.

The plate may be formed from a different material, preferably however, the plate has similar optical characteristics; in particular in a preferred embodiment of the invention the refractive index of the plate is different from the refractive index of the lens by less than 0.3.

In a modification of the invention, the plate comprises at least two layers. It has been found out that a lens array may be pressed onto a substrate plate, in particular in a hot pressing operation. Therein, one layer is formed by the material from which the lenses are formed, and the other layer is formed by the substrate plate. It is to be understood that the substrate plate and the lenses with that definition may as well be formed from different materials.

The interface between the at least two layers preferably is substantially flat such as to largely avoid optical interferences due to said interface.

In a modification of the invention the plate, in particular the substrate plate, may comprise a structure, in particular for homogenizing the light or for enhancing the bonding of the two layers.

The lens array is preferably formed such that the lenses are spaced from each other at their edges by less than 5, preferably less than 2, and most preferably less than 1 mm. In particular, the collimation lenses are adjacent to each other.

In this manner, the LEDs in the associated LED array may be packed close to each other which allows to provide a compact light source with very high luminosity.

The lens array is preferably formed in one piece. "One piece" in the sense of the invention also means an arrangement in which components made of different glasses have been thermally bonded to each other. In contrast to plastic lenses, e.g., that are adhered to a plate, such a structure exhibits high mechanical strength and thermal resistance.

The invention further relates to a method for fabricating a lens array, in particular a lens array such as set forth above.

In the method, a plurality of blanks, in particular glass blanks, are introduced into a pressing mold. The pressing mold has a plurality of recesses which define the contour of the lenses, in particular the asphere.

After this, the blanks are pressed into lenses, in particular into collimation lenses whereby the blanks at least partially bond to each other. Hence, the blanks have a volume larger than the recess associated with a respective blank. As such, the excess material is squeezed off on the edges and flows into each other. This allows in particular to fabricate the plate of a lens array in a particularly simple manner.

To do so, the mold preferably is substantially flat on one of its sides.

In a modification of the invention, during the pressing step the blanks are pressed onto a substrate, in particular a disc, whereby the material of the blanks bonds to the substrate.

This embodiment allows to provide a lens array with enhanced stability, as the material of the blanks bonds to the substrate in a large area. The substrate is preferably made of glass. Hence, the same material as that of the blanks may be used as a substrate glass, e.g. It is equally contemplated for the substrate to be made of a different material.

In a modification of the invention the material of the blanks has, during the pressing operation, a lower viscosity than the material of the substrate. That is to accomplish that the interface between the substrate material and the material of the blanks remains flat, i.e. that the material of the blanks does not or not substantially impress into the substrate glass. Impression of the material of the blanks into the glass substrate could otherwise lead to optical errors.

To the end that, while pressing, in particular during the hot pressing operation, the substrate material is harder than the material of the blanks, a material having a different melting and/or glass transformation temperature may be used. Another way to achieve this is to heat the blanks material more than the substrate material.

In a modification of the invention the substrate is thinned following the pressing step to yield an overall thinner structure of the lens array with a concomitantly high strength.

The blanks may be placed in the mold in form of balls, or gobs, e.g. Placing fibers is much more simple, though placing balls or gobs allows to achieve a more homogeneous distribution of the material during the pressing operation.

The blanks are preferably made of glass and are pressed under a temperature from 20° C. to 100° C., preferably from 50° C. to 60° C. above the glass transformation temperature $T_g$.

Preferably, glass blanks made of optical glass having a glass transformation temperature $T_g$ between 350 and 650° C. are used.

The following optical glasses which are commercialized by the applicant under the following names are especially useful for the invention: P-PK53, P-SK57, P-SF8, P-LASF47, P-SF67, P-SF68, N-FK51A, N-FK5; N-PK52A, N-PK51, N-LaF33, P-LaF46B.

As the substrate glass has not to undergo deformation, a substrate from a different material may be used, in particular a glass having a higher glass transformation temperature $T_g$ may be used. Thus, glasses such as that commercialized by the applicant under the names D 263, B270, F2, N-LaF21, N-LaF33, N-LaF34, N-LaF35, N-LaF36 are used as a substrate.

BRIEF DESCRIPTION OF THE DRAWINGS

The invention will be described below in further detail with reference to FIGS. 1 to 9 which schematically show exemplary embodiments of the invention wherein.

DETAILED DESCRIPTION OF THE DRAWINGS

Figure 1:
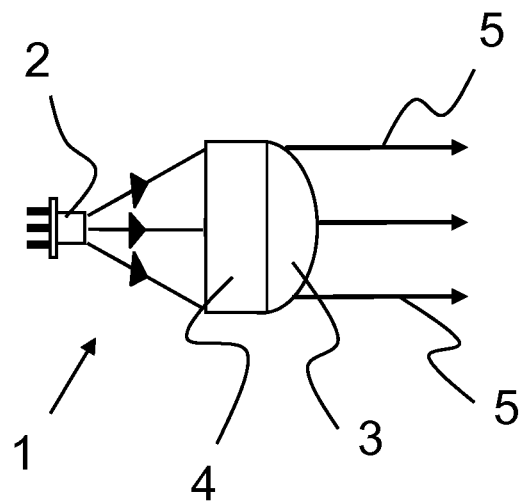
FIG. 1 schematically shows a LED light source.

FIG. 1 schematically shows a LED light source 1.

LED light source 1 comprises a LED 2 preferably arranged on a circuit board (not shown) which is preferably provided as a high power LED. Light emitted by LED 2 is collimated by an aspherically shaped collimation lens 3 made of glass such that the emitted light beams 5 extend substantially parallel to each other.

Collimation lens 3 is arranged on a plate 4 and as such in particular forms a part of a lens array.

Figure 2:
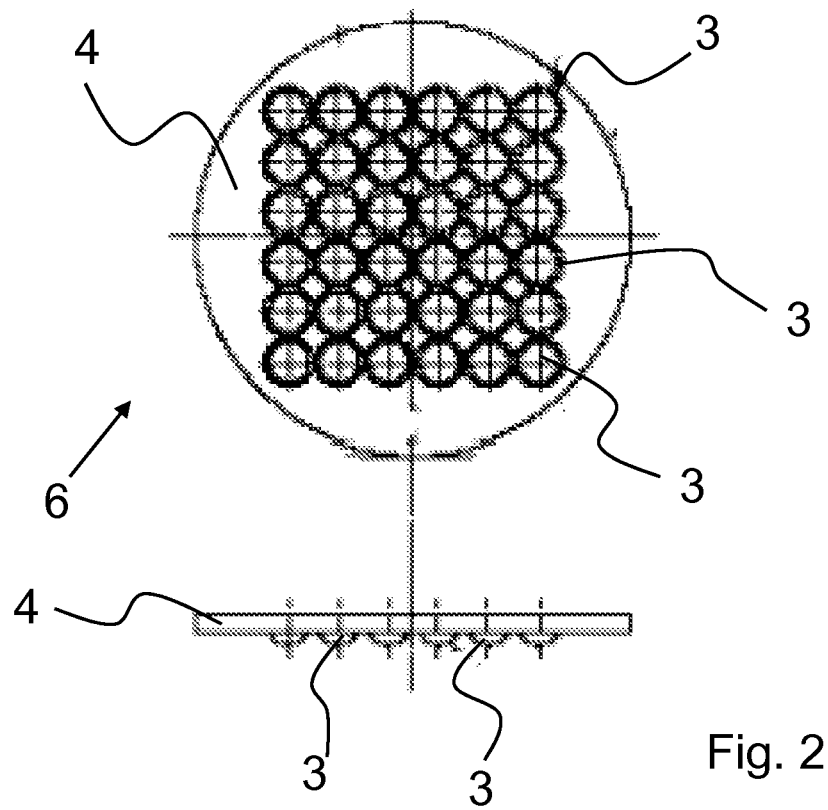
FIG. 2 schematically shows a lens array.

FIG. 2 schematically shows a lens array 6 as comprising a plate 4 including a plurality of collimation lenses 3. Collimation lenses 3 are, in this exemplary embodiment, packed as close to each other as to be substantially adjacent each other.

Due to the chosen aspect ratio, of in this exemplary embodiment more than 0.4, a very good collimation effect may be achieved, in particular in the case where the array 6 is arranged close in front of the LED (not shown).

Figure 3:
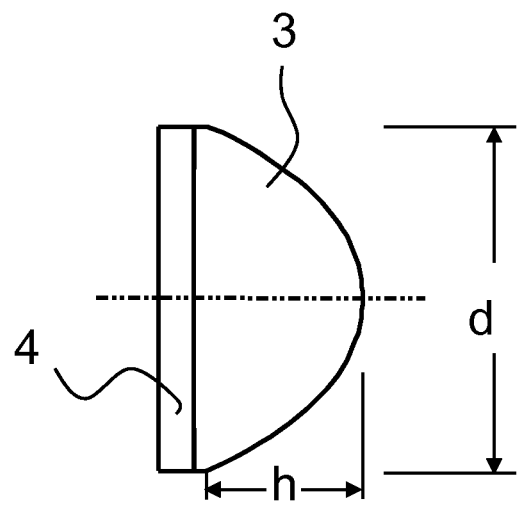
FIGS. 3 and 4 show different embodiments of a collimation lens in further detail.

FIG. 3 shows an exemplary embodiment of a collimation lens 3. Collimation lens 3 of this embodiment is equally is arranged on a plate 4.

The aspect ratio of collimation lens 3 is calculated from its height h divided by its width or diameter d. So what is relevant, is only the height h of the curved lens body.

The lens illustrated herein has an aspect ratio of about 0.47.

Figure 4:
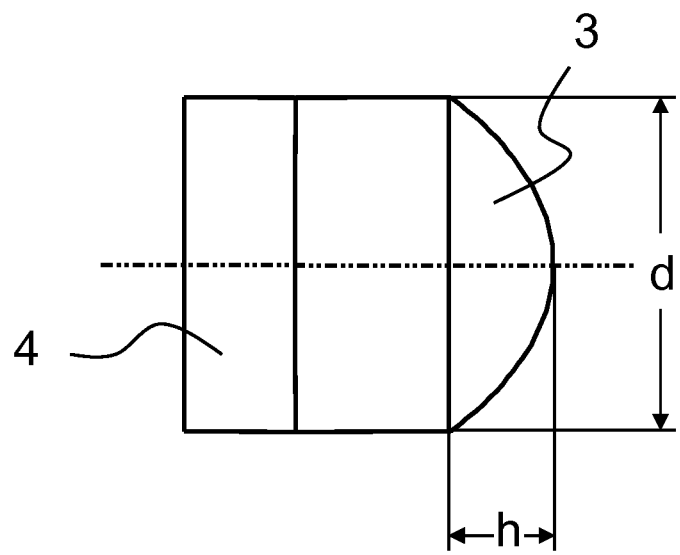

FIG. 4 illustrates another exemplary embodiment of an aspherical collimation lens 3. In this embodiment plate 4 is formed from two layers. The aspect ratio here is slightly smaller than that of the collimation lens of FIG. 3.

Figure 5:
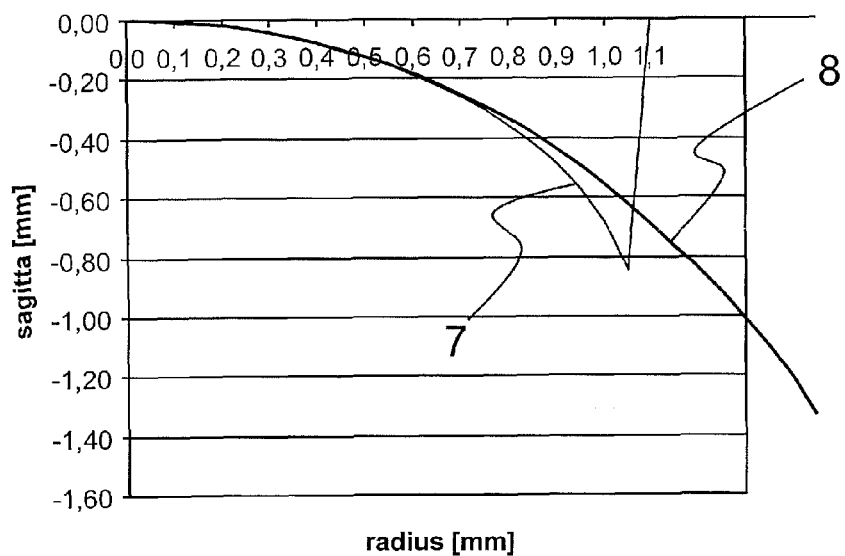
FIG. 5 schematically shows the passage of the light beams in an embodiment of the invention.

FIG. 5 schematically shows the characteristic of an asphere (8) in comparison to a spherical characteristic (7). Here, the distance from the center of the lens is plotted on the x-axis. The height of the lens is plotted on the y-axis.

Asphere 8 has been pre-calculated such that collimation is possible throughout the line of the asphere curve 8, emitting light in parallel to the central axis of the lens in forward direction.

It may be seen that the curve of the sphere already ceases at a radius somewhat slightly above one millimeter so that it cannot "catch" light any more. An asphere 8, however, can collimate light beams with a much wider emission angle.

Figure 6:
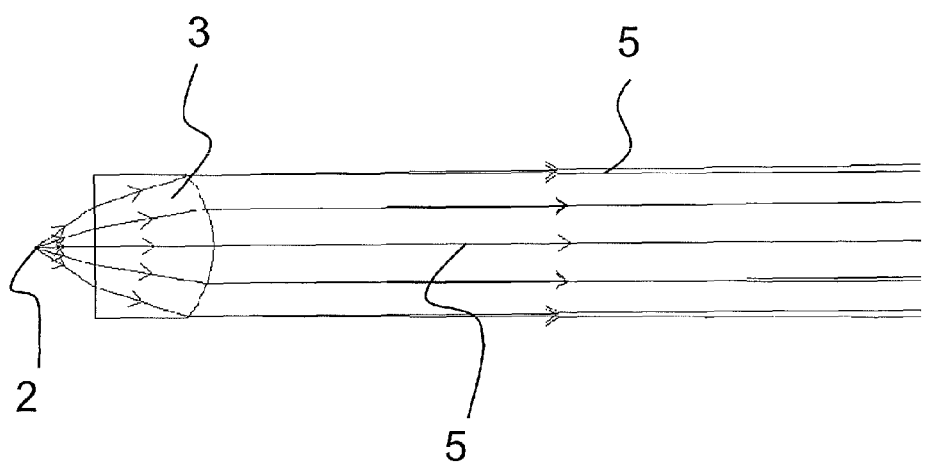
FIG. 6 is for illustrating the collimation effect of an aspherically shaped lens in further detail.
Figure 7:
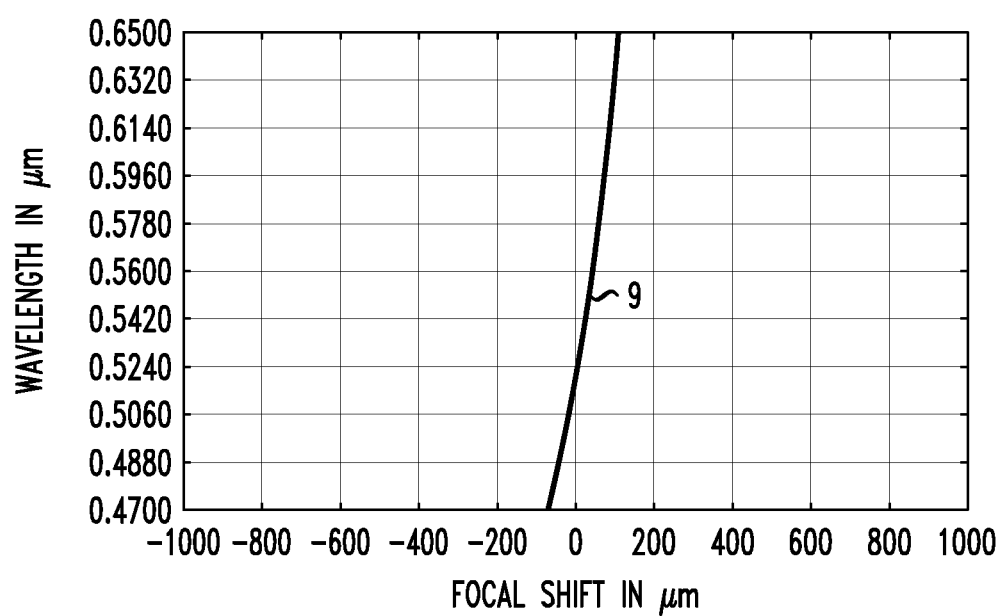
FIG. 7 shows the wavelength dependent focal shift of an exemplary embodiment of the invention.

FIG. 6 schematically shows an exemplary embodiment in which the passage of the beams is illustrated. It may be seen that light which is emitted from LED 2 in a wide emission angle of about +/−60°, is redirected by aspherically shaped collimation lens 3 such that light beams 5 are emitted substantially parallel to each other.

FIG. 6 schematically shows the wavelength dependent focal shift in an exemplary embodiment of the invention. The x-axis gives the focal shift in μm, the wavelength in μm is plotted on the y-axis. With an appropriate choice of the glass, a lens with a minor focal shift throughout the visible range may be provided. Such a lens may be used for LEDs of different colors and is also useful for white light LEDs.

Figure 8:
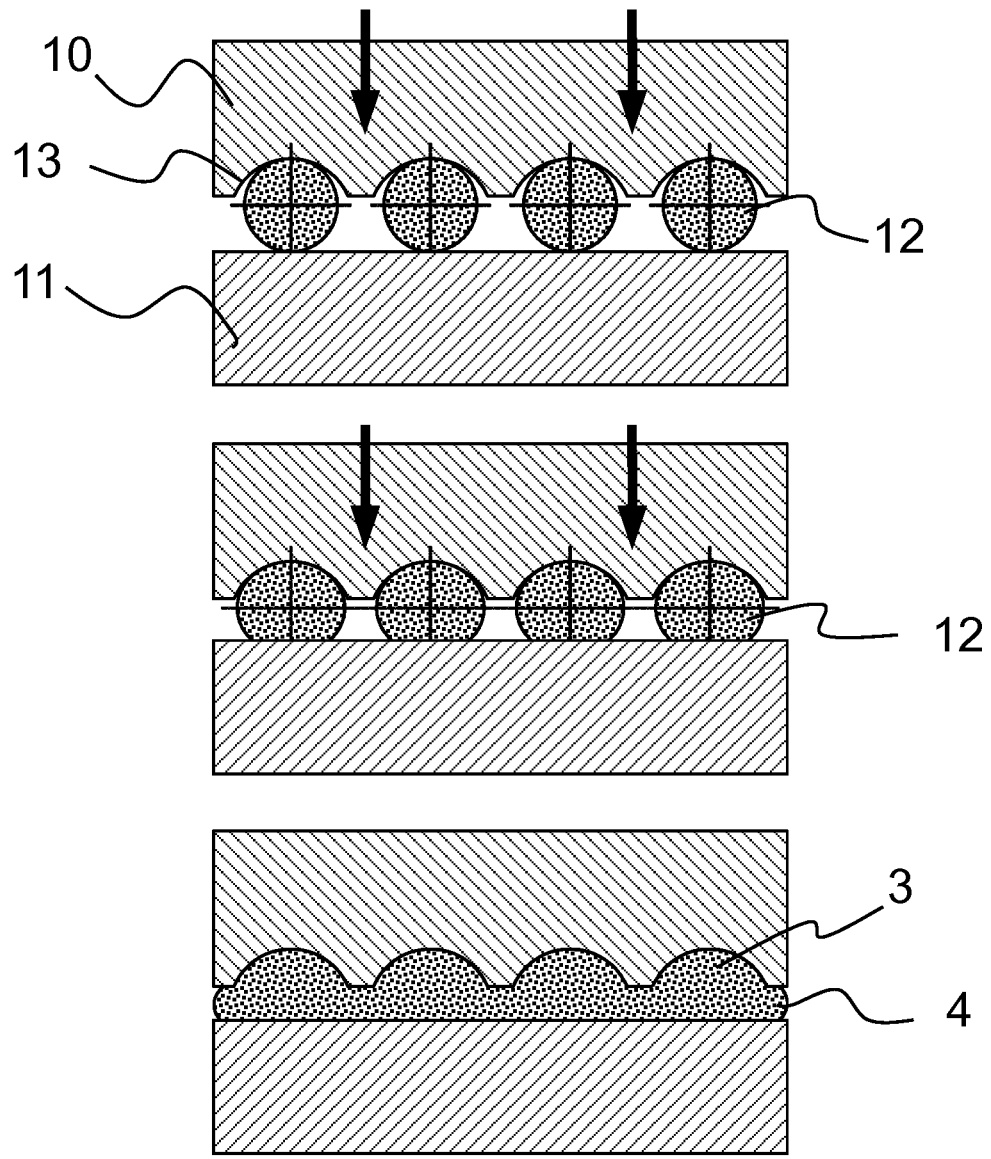
FIG. 8 is for a further description of the fabrication of a lens array.

Referring to FIG. 8 a method for fabricating a lens array will be described in greater detail.

In a first step (illustrated on top) blanks 12 of glass (balls, gobs or fibers) are placed in a pressing mold. The pressing mold comprises an upper mold part 10 which has recesses 13, and a lower mold part 11 having a substantially plane or micro-structured surface such as Fresnel or Lotus effect structures. Recesses 13 define the shape of the aspherical lenses.

Blanks 12 are compressed in a hot pressing operation while at least the upper part 10 of the pressing mold is heated.

During compression (illustrated in the center) the blanks first take the form of recesses 13 and as such assume an aspherical contour.

The volume of blanks 12 is chosen such that it is larger than the volume of recesses 13. Thus, the excess material is pushed sidewards for forming a lens array as illustrated below in FIG. 8 which comprises collimation lenses 3 and a plate 4. Plate 4 is, in this exemplary embodiment, made of the same material as collimation lenses 3, since plate 4 is pressed from the material of blanks 12.

Figure 9:
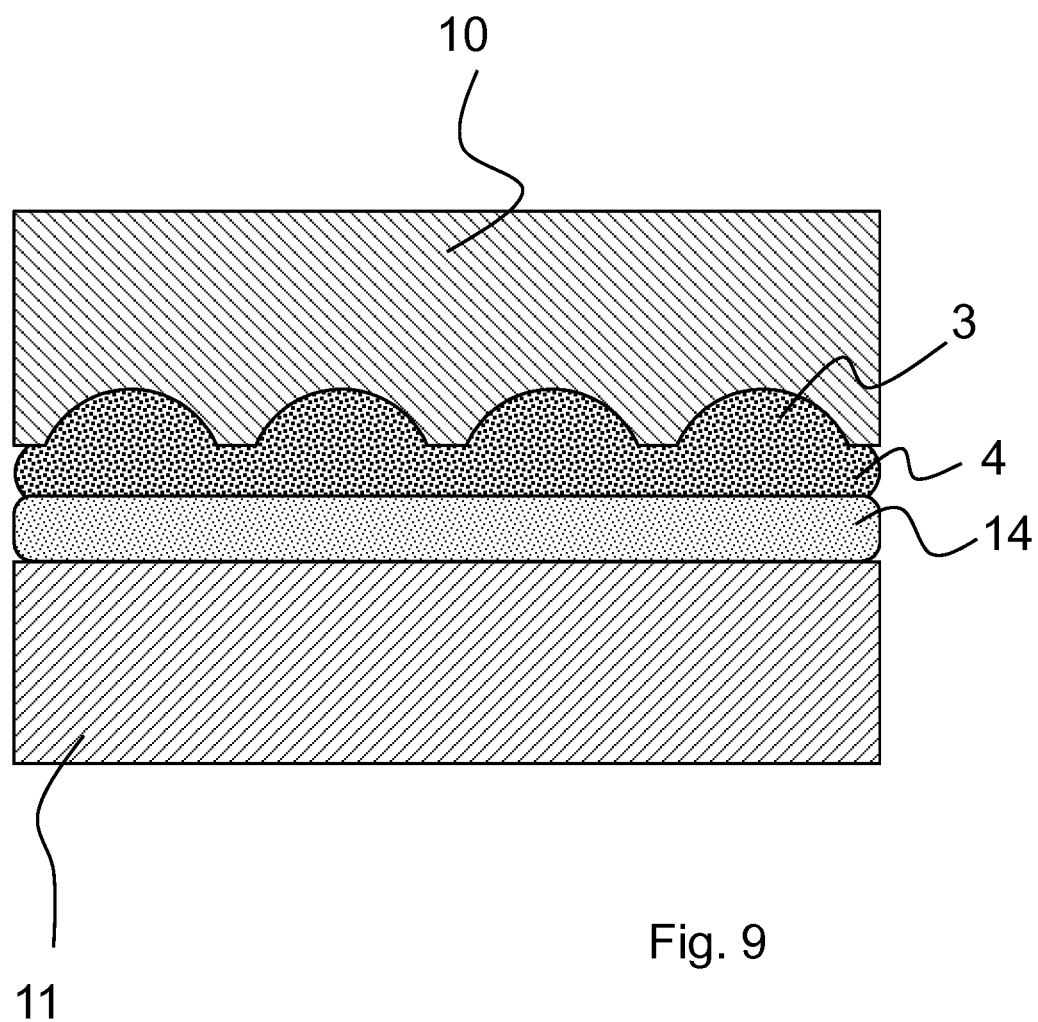
FIG. 9 shows another embodiment of a method for fabricating a lens arrays.

Referring to FIG. 9 an alternative exemplary embodiment of a method for pressing a lens array will be explained in detail.

In contrast to the method illustrated in FIG. 8 a substrate plate 14 is placed on the lower part 11 of the pressing mold. Otherwise, the method corresponds to the embodiment illustrated in FIG. 8, i.e. in particular the upper part 10 of the pressing mold defines the shape of aspheric lenses 3. In this embodiment of the method the material of the blanks likewise forms into plate 4 on which lenses 3 are arranged.

Plate 4 and substrate plate 14 are bonded in a large area, such that the lens array produced by this exemplary embodiment has a higher stability than that of the exemplary embodiment illustrated in FIG. 8.

The interface between plates 14, 4 preferably is substantially flat.

This may be achieved, e.g., by using a glass as a substrate plate 14 that has a higher glass transformation temperature $T_g$, or by maintaining plate 14 at a lower temperature during the hot pressing operation.

It will be understood that the invention is not limited to a combination of the features such as described above; rather a person skilled in the art may combine any features, as appropriate.

| Reference numerals | |
|---|---|
| 1 | LED light source |
| 2 | LED |
| 3 | collimation lens |
| 4 | plate |
| 5 | light beam |
| 6 | lens array |
| 7 | sphere |
| 8 | asphere |
| 9 | focal shift |
| 10 | pressing mold upper part |
| 11 | pressing mold lower part |
| 12 | blank |
| 13 | recess |
| 14 | substrate plate |

What is claimed is:

1. A LED light source comprising a plurality of LEDs and an array including a plurality of collimation lenses made of glass or glass ceramics, wherein an aspect ratio of said collimation lenses is larger than 0.1, characterized in that said collimation lenses are spaced from said LEDs by less than 1.5 mm.

2. The LED light source according to claim 1, characterized in that said LED light source is formed such that light emitted by said LED in an angle of at least ±30° is emitted substantially in a bundle in forward direction.

3. The LED light source according to claim 1, characterized in that the LED light source is formed such that divergence of a light beam of light emitted by the LED in an emission angle of ±60° from a central axis of the LED is, in a distance of 25 cm, less than 5 cm.

4. The LED light source according to claim 1, characterized in that said collimation lens is made from a material having a refractive index $n_d$ of more than 1.4.

5. The LED light source according to claim 1, characterized in that said collimation lens is made from a material having an Abbe coefficient $v_d$ of more than 35.

6. A LED light source comprising a plurality of LEDs and an array including a plurality of collimation lenses made of glass or glass ceramics, wherein an aspect ratio of said collimation lenses is larger than 0.1, characterized in that said collimation lenses are disposed on a transparent plate.

7. The LED light source according to claim 1, characterized in that the crown height of the collimation lenses is more than 0.1 mm.

8. The LED light source according to claim 1, characterized in that said collimation lenses have a diameter from 0.2 to 10 mm.

9. The LED light source according to claim 6, characterized in that said lenses are arranged on a plate made of glass or glass ceramics, and in that said plate functions as a filter or converter.

10. The LED light source according to claim 6, characterized in that said lenses are arranged on a plate made of glass or glass ceramics, and in that said plate has an optically active microstructure at one or both of its faces.

11. The LED light source according to claim 6, characterized in that said plate comprises at least two layers.

12. The LED light source according to claim 11, characterized in that the interface between the at least two layers is substantially flat.

13. The LED light source according to claim 12, characterized in that said lenses are spaced from each other on their edges by less than 5 mm.

14. The LED light source according to claim 6, characterized in that the lens array is formed in one piece.

15. A method for fabricating a lens array of an LED light source also having a plurality of LEDs, the method comprising:
    introducing blanks into a pressing mold which has a plurality of recesses; and
    pressing the blanks into lenses whereby said blanks at least partially bond to each other;
    wherein the lenses are collimation lenses made of glass or glass ceramics, wherein an aspect ratio of said collimation lenses is larger than 0.1.

16. The method for fabricating a lens array according to claim 15, characterized in that said mold is substantially flat on one of its sides.

17. The method for fabricating a lens array according to claim 15, characterized in that while pressing the blanks are pressed against a substrate such that the material of the blanks combines with said substrate.

18. The method for fabricating a lens array according to claim 16, characterized in that at least during pressing the blank material is softer than the substrate material.

19. The method for fabricating a lens array according to claim 16, characterized by thinning the substrate following the pressing step.

20. The method for fabricating a lens array according to claim 15, characterized by pressing the blanks onto a substrate made of a different material.

* * * * *